United States Patent
Headrick

[15] 3,662,891
[45] May 16, 1972

[54] APPARATUS FOR CONFINING FLOATING MATERIALS

[72] Inventor: Edward E. Headrick, 4900 Crown Avenue, La Canada, Calif. 91011

[22] Filed: Apr. 22, 1970

[21] Appl. No.: 30,927

[52] U.S. Cl. .................................. 210/242, 61/1 F, 61/5, 210/DIG. 21
[51] Int. Cl. .................................. B01d 21/02, E02b 15/04
[58] Field of Search .............. 61/1, 5; 210/241, 242, DIG. 21; 52/638

[56] References Cited

UNITED STATES PATENTS

| | | | |
|---|---|---|---|
| 2,401,229 | 5/1946 | Cohen | 52/638 X |
| 3,219,190 | 11/1965 | Thune | 210/242 |
| 3,221,884 | 12/1965 | Muller | 61/1 X |
| 3,348,690 | 10/1967 | Cornelissen | 210/242 |
| 3,503,214 | 3/1970 | Desty et al. | 61/1 |

FOREIGN PATENTS OR APPLICATIONS

| | | | |
|---|---|---|---|
| 1,528,855 | 5/1968 | France | 61/1 |

*Primary Examiner*—David J. Williamowsky
*Assistant Examiner*—David H. Corbin
*Attorney*—Christie, Parker & Hale

[57] ABSTRACT

A boom arrangement for the collection of oil or other material floating on the surface of water, the boom being suited for towed or stationary positioning. The boom comprises two flexible arms defining the sides of a converging channel and a harness located between the arms for providing the load bearing structure for supporting and maintaining the boom in proper configuration whether being drawn through the water or being used in a station keeping application. A plurality of wave attenuators may be located near the narrow end of the channel with a controllable gate linking this end of the boom and a collection device located on the side of the gate opposite the narrow end.

12 Claims, 5 Drawing Figures

PATENTED MAY 16 1972 3,662,891

INVENTOR
EDWARD E. HEADRICK
BY
Christie, Parker & Hale
ATTORNEYS

INVENTOR
EDWARD E. HEADRICK
BY
Christie, Parker + Hale
ATTORNEYS

APPARATUS FOR CONFINING FLOATING MATERIALS

DESCRIPTION OF THE PRIOR ART

The present invention relates to a device for controlling the spread of liquid and other pollutants floating on the surface of a second liquid and in particular to a boom and collection device suitable for stationary or towed use to channel and collect oil floating on the surface of water.

In the past rudimentary efforts have been made to construct boom arrangements for collecting oil on the surface of water. As a general rule such booms have consisted of a plurality of logs or the like attached end to end and generally arranged in two angularly related lines narrowing to an apex opposite the open end of the boom. Such booms are subject to two serious deficiencies, the first being they are not effective containers of oil or the like located between the two arms of the boom and are not suitable for use in currents of any appreciable magnitude. Such booms are also particularly subject to wave action which can cause substantial quantities of the oil contained in the enclosed area defined by the boom to be spilled over as waves traverse the length of the boom.

SUMMARY OF THE PRESENT INVENTION

The present invention provides a substantially more effective apparatus for collecting oil floating on the surface of water. It provides a V shaped boom comprising two arms, preferably formed from a cluster of parallel elongated air and water tubes, which are flexible over their entire length and essentially insensitive to wave action. The arms have a specific configuration which in effect locks the boom to the surface of the water preventing oil from being spilled over or shipped under the boundary defined by the boom. A unique harness arrangement located between the two arms of the boom extends the length thereof and utilizes an intersecting pattern of cables crisscrossing between opposite arms, the number of intersections increasing according to a predetermined formula toward the apex of the V shape.

A series of wave attenuators are normally located near the apex of the V defined by the boom arms and comprise one or more buoyant members disposed parallel to a line bisecting the boom angle to reduce the trochoidal velocity of waves travelling down the channel defined by the boom so as to prevent surge and splash adjacent the controllable gate and promote a continuous, smooth flow of water and oil in this area.

The controllable gate is a link between the boom and an oil collection container. The gate acts to skim oil floating on the surface of the water and provides the mechanism whereby the oil is moved into the container under the influence of wave action. The gate is similar in configuration to the oil boom in that each side of the gate utilizes a cluster comprising air tubes floating on and extending above the surface of the water and a water filled tube located at and extending downwardly from the surface of the water. Extending between the two sides of the gate is a membrane or bottom over which the water and oil mixture floats in its path to the container. An inflatable weir is located at the front of the gate at the point of attachment to the apex of the boom and is inflated to the extent necessary during the collection process as conditions warrant to produce a "head" of water at the gate or to act as a barrier to the entry of oil into the gate after the container has been filled and is either in the process of being replaced or pumped out. Optionally, provided along the length of the gate are one or more check valves which are activated by waves as they are reflected from the point of entry into the oil container. The purpose of the check valves is, in conjunction with wave action, to pump oil into the container and to prevent oil transferred along the gate toward the container from being returned at the entrance to the gate under the influence of waves reflected from the collection vehicle.

The invention provides an apparatus for entraining material on the surface of a liquid comprising a first and second elongated arm arranged in a converging channel configuration having a wide opening at one end and a narrow opening at the opposite end. A harness is located between the arms and has a plurality of intersecting lines defining a crisscross pattern with the spacing of the intersections of said lines in a direction from the wide opening to the narrow opening approximating a geometric progression. The harness is arranged such that the arms are positioned and held in the converging configuration on the surface of the liquid with means being located at the wide opening end for connecting the apparatus to a positioning device and gate means being located at the narrow opening end for connecting the apparatus to a vehicle for collecting floating material which has been confined between the arms of the wide opending end and channelled toward the narrow opening end.

DESCRIPTION OF THE DRAWINGS

The invention will be better understood by reference to the following figures wherein.

DESCRIPTION OF A SPECIFIC EMBODIMENT

Figure 1:
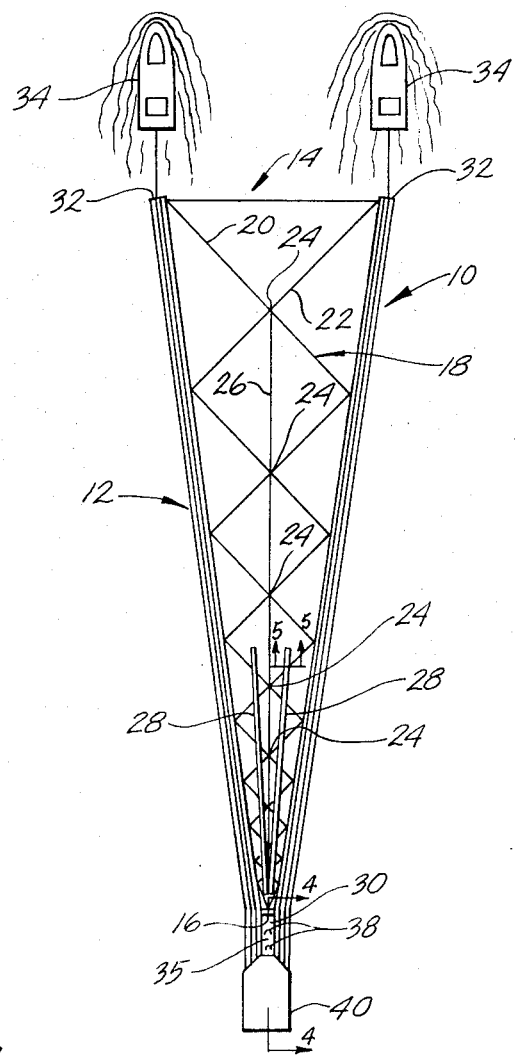
FIG. 1 is a plan view of the apparatus for confining floating materials according to the present invention.

As shown in the plan view of FIG. 1, the apparatus of the present invention includes a first elongated arm 10 and a second elongated arm 12 arranged in a converging channel or "V" configuration to thereby define a wide opening 14 at one end of the channel and a narrow opening 16 at the opposite end of the channel. A harness 18 is located in the channel between arms 10 and 12 and comprises a first line 20 beginning at arm 12 extending in a crisscross pattern between the two arms from the wide opening 14 to the narrow opening 16. A second line 22 begins at arm 10 and extends in a similar crisscross pattern from end 14 to end 16 of the apparatus. The crisscross pattern of lines 20 and 22 defines a series of intersections 24 which lie along a line approximately through the center of the channel. The angular direction of each line 20 and 22 in each traverse between arms is chosen such that the angle defined by lines 20, 22 at each point of intersection is 90°. Because of the converging configuration of the arms 10 and 12, this causes the points of intersection 24 to be spaced closer together moving in the direction from the wide opening end 14 to the narrow opening end 16, the frequency of intersection increasing at approximately a geometric rate in this direction. A central cable 26 intersects all points of intersection 24. Alternatively a "tree" type harness can be substituted for the intersecting grid harness in FIG. 1.

One or more wave attenuators 28 are removably attached to the harness 18 in the throat of the converging channel and provide a means whereby the trochoidal velocity and energy of waves moving down the channel is dissipated or significantly reduced prior to incidence at a controllable gate 30 located in the narrow end 16 of the channel.

Tie points 32 are provided at the ends of arms 10 and 12, respectively, adjacent the wide opening 14 such that the apparatus can be connected to a pair of tug boats 34 or the like to permit the apparatus to be towed through an area in which oil or other floating material is present on the water. In similar fashion the ends of arms 10 and 12 can be connected to buoys to permit the apparatus to be used in a station keeping application with current flow directing material to be collected into the wide opening and through the channel to the narrow opening.

Figure 4:
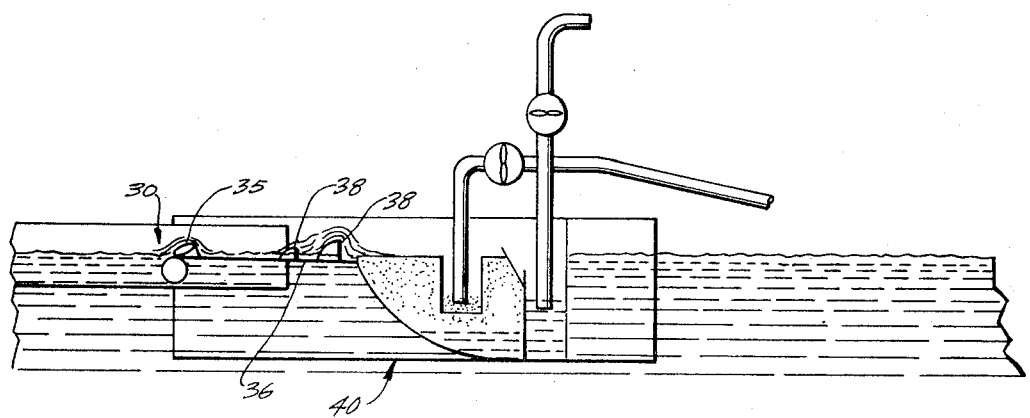
FIG. 4 is a sectional view taken along lines 4-4 of FIG. 1.

Material entrained between the arms of the boom is caused to move down the channel under the influence of the movement of the boom as it is towed through the water or the current as it flows therealong. The controllable gate 30 provides a weir 35 (FIG. 4) in the form of an inflatable cylinder or tube at the end of the gate adjacent arms 10, 12 which provides a barrier having an adjustable height to the flow of water coming down the channel. Water and floating material passing into gate 30 moves along a channel between arms 10 and 12 which is bottomed by a membrane 36 (FIG. 4) and has one or more check valves 38 spaced at predetermined intervals therealong. The end of the gate opposite weir 35 empties into a collection vehicle 40 which is arranged so as to entrap the material floating on the water while permitting the water introduced into the vehicle to be discharged from the vehicle.

To permit the apparatus of the present invention to be used in currents or to be towed at speeds in excess of one knot it has been found that the preferred angle enclosed by the arms of the boom is approximately 38° 56'. Such an angle is twice the angle at which a bow wave is propagated when any object moves through the water. By confining the enclosed angle of the boom to approximately 38° 56' or less it has been found that the "stagnation wedge effect" and "fractured lens effect," both of which are serious problems characteristic of prior art oil collecting booms, is avoided. When prior art booms were towed at speeds in excess of approximately 0.7 knots the aforementioned effects combine to cause oil or other material which is being collected to be carried down and underneath the boom, thereby rendering the collecting operation only partially effective. By confining the angle of the boom to that specified above the vortices and eddy currents associated with such effects are avoided even when the boom is towed at speeds of approximately 10 knots. Thus the boom or apparatus of the present invention is totally effective in the collection operation and provides, in addition, a substantial increase in efficiency commensurate with the increase in speed with which it can be towed through the water.

In terms of practical embodiments, booms having an enclosed angle approximately 38° 56' have been found to perform satisfactorily. However, as the approximation begins to exceed 38° 56' significantly on the order of 8° or more, the performance of the boom begins to deteriorate, an occurrence which is accentuated as the towing speed of the boom is increased. At a towing speed in excess of three knots it has been found that the angle defined by the boom must not exceed 38° 56' as a maximum in order to perform satisfactorily. The preferred embodiment is slightly less than 38° 56' to compensate for wave shape and towing angles, e.g., when turning corners with the boom.

The controllable gate 30 is the link between the boom and the oil collection device 40 and controls the rate at which oil or other material is transmitted to the vehicle. No mechanical means are required for pumping the floating material into the collector, the entire assembly relies on wave action for pumping force. The check valves prevent the floating material from discharging from the entrance end of gate 30 once it has passed the weir 35.

Figure 2:
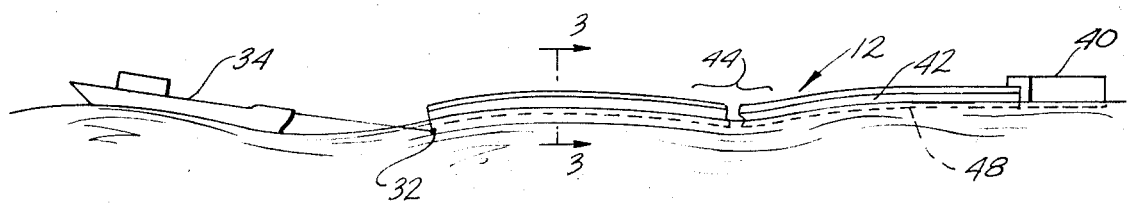
FIG. 2 is a side elevational view of the apparatus shown in FIG. 1.
Figure 3:
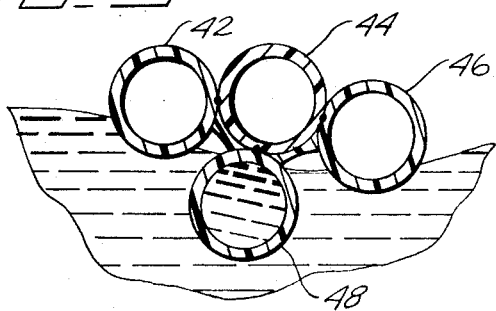
FIG. 3 is a sectional view taken along lines 3-3 of FIG. 2.
Figure 5:
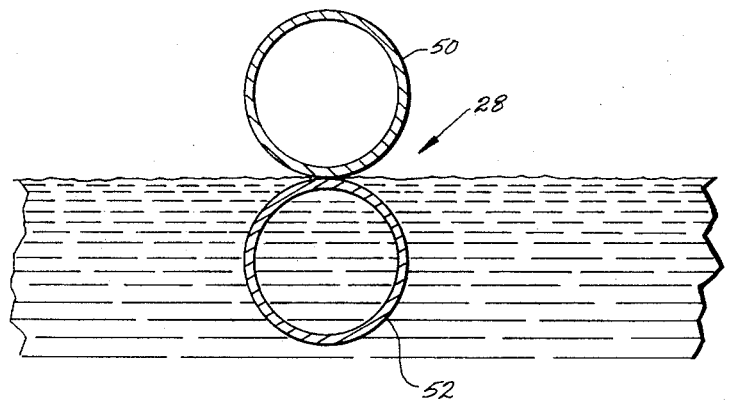
FIG. 5 is a sectional view taken along lines 5-5 of FIG. 1.

A side elevational view of the apparatus is shown in FIG. 2. As shown therein and from FIGS. 1, 3 and 5 arm 12 can be seen to include four elongated tubes 42, 44, 46, 48 extending longitudinally of one another and wave attenuator 28 is similar, including two elongated tubes 50, 52. Each tube is fabricated of a flexible airtight material such as polyvinyl chloride coated nylon to permit inflation with air or water to an inflated diameter of approximately four to 18 inches depending on the water and weather conditions to be encountered. The upper three tubes 42, 44, 46 are inflated with air for buoyancy and the lower tube 48 is inflated with water for ballast. Likewise tube 50 is air inflated and tube 52 is water inflated. A structure is thereby provided which in effect "locks" itself to the surface of the water in a manner similar to the structure described in copending application Ser. No. 808,287 now U.S. Pat. No. 3,567,019 filed Mar. 18, 1969 to provide a barrier which extends above and below the surface thereof for a significant distance. The flexibility of the material comprising the boom allows it to track wave action as is shown in FIG. 2 providing a continuous, unbroken barrier at the surface of the water along its entire length.

The boom arms 10, 12 telescope into collection vehicle 40 (FIG. 4) to provide an unbroken area of confinement from the mouth or wide opening of the apparatus to the collection vehicle. As needed, a tender can be brought along side vehicle 40 to pump off the collected floating material. A submerged antiseparation cable 50 extends across the wide opening end to prevent spreading of the arms beyond the desired angle.

What is claimed is:

1. An apparatus for entraining material on the surface of a liquid comprising:
    a first flexible elongated arm and a second flexible elongated arm arranged in a converging channel configuration having a wide opening at one end and a narrow opening at the opposite end, each of said arms being entrained at the liquid surface for providing a vertical barrier extending above and below the surface of the liquid a predetermined distance; and
    a harness located between said arms having a primary line located between the first and second arms and a plurality of secondary lines interconnecting the primary line and the first and second elongated arms, the length of the secondary lines diminishing in the direction of the wide to the narrow opening for producing a constant angle of convergence and a straight line orientation of the elongated arms on the surface of the liquid.

2. An apparatus according to claim 9 wherein adjacent pairs of secondary lines of the harness intersect in alternately inverted 90° angular V-shaped patterns to define a succession of squares of diminishing area, the spacing of said intersection in a direction from said wide opening to said narrow opening having an approximate geometric progression.

3. An apparatus according to claim 9 wherein pairs of secondary lines of the harness intersect at 90° angles, successive pairs of said secondary lines defining inverted V-shaped patterns, the spacing of said successive pairs in a direction from said wide opening to said narrow opening having an approximate geometric progression.

4. An apparatus according to claim 1 wherein the angle enclosed by the first and second elongated arms is less than 40°.

5. An apparatus according to claim 4 wherein each of said elongated arms comprises a plurality of hollow tubes of a flexible material, at least one of said tubes being adapted to be filled with a fluid of a first specific gravity and at least one of said remaining plurality of tubes being adapted to be filled with a fluid of a second lesser specific gravity.

6. An apparatus according to claim 5 including gate means located at the narrow opening end for transmitting floating material which has been confined between the arms of the apparatus through said narrow opening end.

7. An apparatus according to claim 6 including a collection device connected to the narrow opening end of the apparatus for receiving a mixture of the entrained material and the liquid and for selectively retaining said material while discharging said liquid.

8. An apparatus according to claim 7 including a plurality of wave attenuators located adjacent the narrow opening end within the converging channel defined by the apparatus.

9. An apparatus according to claim 8 including at least one check valve means located between the gate means and the collection device.

10. An apparatus according to claim 9 wherein the first and second elongated arms telescope into the collection vehicle.

11. An apparatus according to claim 10 including an antiseparation cable extending across the wide opening end interconnecting the ends of the first and second elongated arms.

12. An apparatus according to claim 11 including means located at the wide opening end for connecting said apparatus to a positioning device.

* * * * *